Aug. 12, 1958 J. C. SEDDON 2,847,649

VARIABLE BANDWIDTH DOUBLE-TUNED TRANSFORMER

Filed Aug. 26, 1955

INVENTOR
J. CARL SEDDON

BY

Oberlin & White ATTORNEYS 2,847,649

VARIABLE BANDWIDTH DOUBLE-TUNED TRANSFORMER

John Carl Seddon, Alexandria, Va.

Application August 26, 1955, Serial No. 530,914

6 Claims. (Cl. 333—72)

(Granted under Title 35, U. S. Code (1952), sec. 266)

The invention described herein may be manufactured and used by or for the Government of the United States of America for governmental purposes without the payment of any royalties thereon or therefor.

This invention relates in general to bandpass filter circuits and in particular to a means for varying the bandpass in a double tuned transformer coupling arrangement.

Coupling between circuits by means of double tuned transformers is a familiar practice in the electronic art. This type of coupling is frequently preferred over other types of transformer coupling because it provides a constant high gain response over a relatively broad band of frequencies.

The width of the bandpass in double tuned transformer coupling arrangements is generally controlled by varying the mutual inductance or coefficient of coupling. Unfortunately, this means of bandpass variation not only alters the bandpass but, as a rule, distorts the general configuration of the response curve as well.

It is an object of this invention to provide a means for varying the bandwidth in a double tuned transformer coupling circuit without varying the gain of the coupling circuit.

It is another object of this invention to provide a means for varying the bandwidth in a double tuned transformer coupling circuit without serious alteration of the general configuration of the frequency vs. response curve for the coupling circuit.

It is still another object of this invention to provide a means for continuously varying the bandwidth from minimum width to maximum width about a constant center frequency in a double tuned transformer coupling circuit.

Other objects of this invention will become apparent upon a thorough understanding of the invention for which reference is had to the following description and drawings of the invention.

Briefly, the device of this invention comprises a conventional double tuned transformer with frequency sensitive impedance circuits shunting the input and output tuned circuit thereof. These shunting impedance circuits, provide a low impedance at frequencies outside the desired pass band and a high impedance at frequencies inside the desired pass band. The circuits are readily adjustable, without switching, to provide any bandwidth between the maximum-minimum limits of the bandpass. By this invention it is no longer necessary to alter the relative physical placement of the two tuned circuits in order to vary the bandpass of the double tuned transformer. The mutual inductance M may be a fixed value. The invention provides a convenient means for varying bandwidth in a double tuned transformer without disturbing the flat-topped, steep-sided characteristics of the response curve and without changing the maximum level of the response curve. Very narrow bandwidths at high frequencies are obtainable, thus permitting excellent image rejection at these high frequencies. In addition the transformer coupling arrangement of this invention has exceptional frequency stability.

Figure 1:
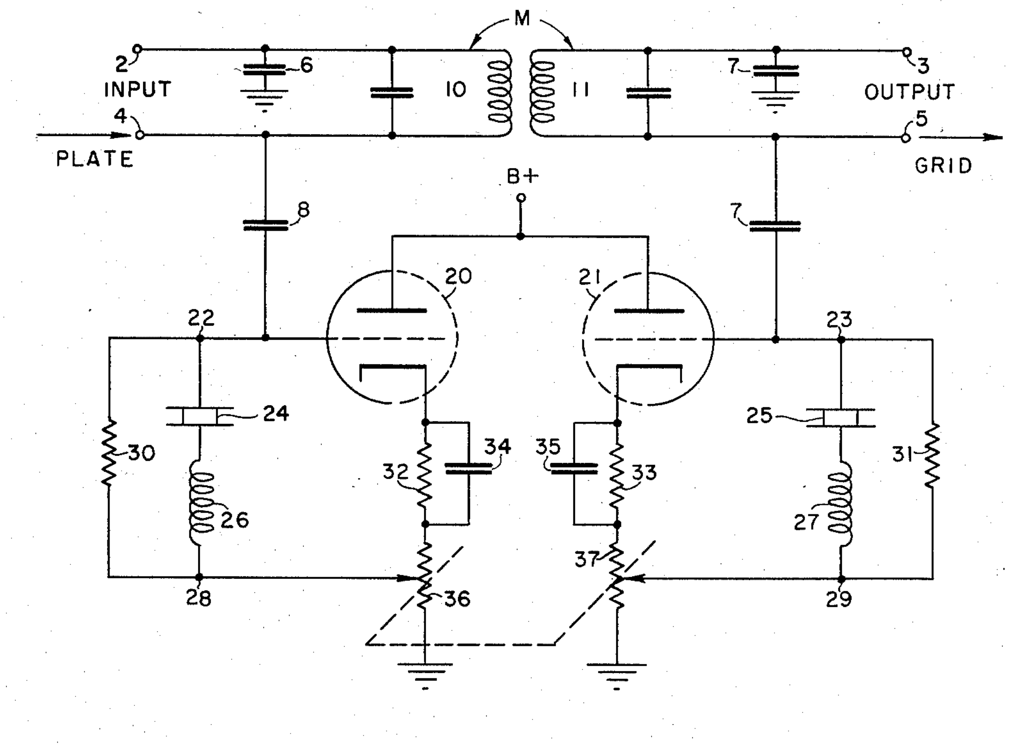
Fig. 1 is a schematic showing of a preferred embodiment of the coupling circuit of this invention.

In Fig. 1 of this disclosure a preferred embodiment has been shown which is illustrative of the basic utility of this invention as a variable bandwidth coupling means. The coupling means shown in Fig. 1 might be utilized, for example, to couple the plate of one amplifier to the grid of the next amplifier in the I. F. channel of a receiver.

In Fig. 1 a first tuned circuit 10 is inductively coupled, as denoted by the letter M in the drawings, to a second tuned circuit 11 which is identical with the first tuned circuit 10. The input to the first tuned circuit is applied across the terminals 2 and 4 and the output of the second tuned circuit is taken across the terminals 3 and 5, as indicated. To provide an R. F. ground with D. C. isolation, the input terminal 2 and the output terminal 3 are separated from ground by condensers 6 and 7, respectively.

The response vs. frequency curve for a critically-coupled double-tuned transformer rises rapidly from low values to a maximum value as the center frequency is approached, remains at a relatively constant level in the vicinity of the center frequency, and then drops rapidly to low values again, thus forming a bandpass flat-topped response. The response curve for a critically-coupled double-tuned transformer is shown, as indicated at *a*, in Fig. 2.

As is well known, the maximum impedance of a critically-coupled double-tuned transformer is determined by the $Q\omega L$ of the tuned circuits; for a given value of inductance, the higher the Q the greater the impedance. In conventional double-tuned transformers, the bandwidth of the response curve depends upon the degree of coupling between the tuned circuits and the Q of these tuned circuits. The selectivity of the circuit is, of course, determined by the bandwidth of the response curve.

In accordance with the invention, a frequency-sensitive impedance circuit, comprising a cathode follower and a novel high Q resonant circuit, is shown connected in shunt with the first tuned circuit 10 of the double-tuned transformer in Fig. 1. Likewise, an identical frequency-sensitive impedance circuit, comprising another cathode follower and another high Q resonant circuit, is shown in similar connection to the second tuned circuit 11 of the double-tuned transformer.

In specific description of the embodiment shown in Fig. 1, the input teminal 4 is connected via R. F. coupling condenser 8 to the grid of the triode 20 and to terminal 22 of the two terminal resonant circuit, the crystal 24 and inductance 26. The cathode of the triode 20 is connected in a biasing arrangement via resistor 32 and condenser 34 in parallel and potentiometer 36 in series therewith to ground. The other terminal 28, of the resonant circuit is connected to the variable tap on the potentiometer 36.

Likewise, the output terminal 5 is connected via R. F. coupling condenser 9 to the grid of the triode 21 and to terminal 23 of the two terminal resonant circuit, the crystal 25 and inductance 27. The cathode of the triode 21 is connected in a biasing arrangement via resistor 33 and condenser 35 in parallel and potentiometer 37 in series therewith to ground. The other terminal 29 of the series resonant tank circuit is connected to the variable tap on the potentiometer 37.

In the triode circuitry, the cathode resistor and condenser in parallel provide a small bias voltage so that the grid will not go positive with the highest magnitude input signal anticipated. Potentiometers 36 and 37 are provided to vary the bias on the triodes 20 and 21 respectively, and thus to vary the gain of these tubes. It will be seen that the triodes 20 and 21 are connected as cathode followers. This arrangement provides a high Q variable impedance circuit.

The gain of these cathode followers may be varied between the theoretical limits, zero to nearly unity, by varying the position of the taps on the potentiometers 36 and 37. These taps may be ganged, as indicated by the dashed line in the drawing, but it is understood that this mechanical connection is not essential to the invention.

Grid leak resistors 30 and 31 are connected between the grid and the variable tap of the cathode potentiometer in the triodes 20 and 21, respectively, to deter a further biasing of these tubes by their electron stream, thus stabilizing their operation. It will be seen that the grid leak resistors, as shown in the drawing, directly shunt the tuned circuits of the transformer. This depicted arrangement is satisfactory when the impedance of the tuned circuits is relatively low. To avoid a substantial loading of the tuned circuits when the impedance of these tuned circuits is relatively high, it has been found advisable to connect the grid leak resistors between the grid and the cathode connected terminal of the cathode potentiometer in their respective triode circuitry.

The novel resonant circuits which form the input to the cathode followers 20 and 21 are peculiarly characterized by an enormously high Q. In comparison, considering a Q of 100, at the desired center frequency, for the parallel resonant LC tuned circuits in the double-tuned transformer, the Q, of the novel resonant circuits might be 100,000, or more, at the desired center frequency.

Figure 2:
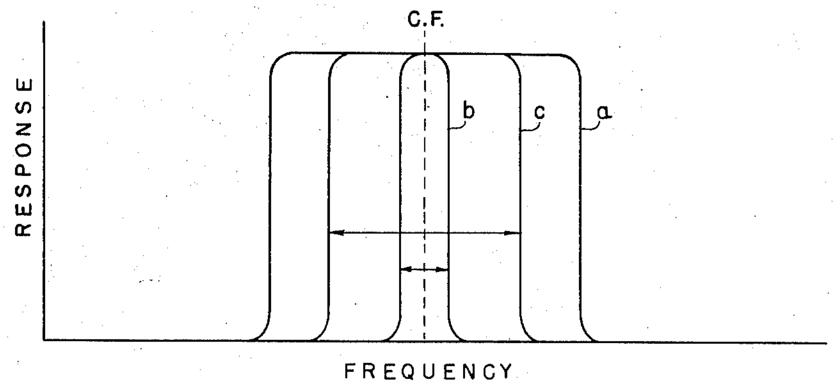
Fig. 2 is a graphical showing of response vs. frequency for the preferred embodiment of Fig. 1.

It has been found, as more fully described in the copending application No. 383,418 filed September 30, 1953, by John Carl Seddon, now U. S. Patent No. 2,805,400 which issued September 3, 1957, that by shunting both the input and output tuned circuits of a conventional double-tuned transformer with such high Q resonant circuits, the width of the bandpass for these tuned transformers can be greatly reduced without serious alteration of the general configuration of the response curve. A typical response curve for this shunted double-tuned transformer is indicated at *b* in Fig. 2. As shown in Fig. 2, the bandwidth of the curve *b* is much narrower than the bandwidth of the curve *a* which, as previously mentioned represents the response curve of a critically-coupled double-tuned transformer. It will also be noted that the height of the two curves *a* and *b*, is substantially the same in each case and that each curve is centered about the same frequency.

Whereas the theoretical operation of the novel high Q resonant circuit employed in this invention is somewhat complicated and has been fully disclosed in the aforementioned application, no detailed repetition of this theory is incorporated in the present disclosure.

However, in basic understanding of this novel circuit, a piezo-electric crystal element, in its holder, has a reactance characteristic substantially similar to the reactance characteristic of a capacitor, an inverse variation from an almost infinite value at low frequencies to a relatively low value at very high frequencies. Except for regions where the crystal vibrates, the reactance characteristic curves are nearly identical throughout the frequency spectrum. In the region of a resonant frequency of the crystal, of course, the crystal reactance curve diverts sharply. A particular piezoelectric crystal element, in its holder, and in its designated circuitry may be said to have an equivalent capacitance which is that value of capacitance having the above-said substantially similar reactance characteristic.

It is important to recognize that a piezoelectric crystal may be said to have two fundamental resonant frequencies. The frequency at which the crystal is naturally prone to vibrate is termed the series resonant frequency of the crystal and the other resonant frequency of the crystal is termed its parallel resonant frequency. This latter resonant frequency is that frequency at which the impedance of the crystal, and everything in parallel therewith, becomes a maximum. For purposes of this disclosure "resonant frequency of the crystal" and "resonance" refers to the above-said parallel resonance.

At resonance, a piezoelectric crystal may be electrically described, in substance, as a parallel resonant tuned circuit with the equivalent capacitance of the crystal in series therewith. At this frequency, the above described equivalent capacitance is undesirable because it prohibits a true parallel resonance response.

In the novel resonant circuit of this invention, an inductance is added in series with the crystal element. This inductance has a magnitude operative to resonate with the above described equivalent capacitance of the crystal element at the resonant frequency of the crystal. Since the combined impedance of the equivalent capacitance and the added inductance is very low near the resonant frequency, it will be seen that the added inductance substantially eliminates the equivalent capacitance of the crystal element and in this manner provides a response which is very much like that of a high Q parallel resonant tuned circuit over an appreciable range of frequencies.

In appreciation of this novel circuitry it is also important to recognize that the resonant frequency of the tuned circuits in the double-tuned transformers and the resonant frequency of the novel resonant circuits, in shunt therewith, preferably, are identical. It has been found that in the vicinity of the center frequency, the response of the shunted double-tuned transformer is essentially that of a high Q parallel LC circuit. Reference is had to the aforementioned copending application for a more detailed explanation of the operation of this novel circuitry.

Considering now the means for varying the bandwidth in this invention, the effective input impedance $Z_i$, of the cathode follower circuit may be determined from the formula $$Zi=\frac{Z}{1-A}$$

where Z is, for all practical purposes, the actual impedance in the grid circuit of the cathode follower and A is the cathode follower gain. It will be seen from the formula that decreasing the gain of a cathode follower has the effect of decreasing the input impedance.

It will be seen that by adjusting the variable taps of the potentiometers 36 and 37 to ground, the input impedance will be reduced to its minimum value which is, of course, the actual impedance in the grid circuit, the impedance of the novel resonant circuit and the circuits in parallel therewith. As previously considered, the impedance of the novel resonant circuit is extremely high in the immediate vicinity of the center frequency and drops off sharply to a minimum value outside this area, substantially as illustrated at *b* in Fig. 2. Thus with the potentiometers adjusted to ground and the gain of the cathode followers at a minimum, the bandpass of the present invention is directly dependent upon the frequency characteristic of the novel resonant circuits in shunt with the double-tuned transformer. By adjusting the variable taps of the potentiometers in the opposite direction, away from ground, the impedance of the overall variable impedance circuits, of which the novel resonant circuits are an important part, is increased. In this manner, the bandwidth may be varied between its minimum and maximum positions, as represented in Fig. 2 by the curves *b* and *c*, respectively.

The maximum bandwidth obtainable is 1/1—A times the minimum bandwidth. Since the frequency characteristic of the novel resonent circuit determines the minimum bandwidth obtainable, it will be seen that the maximum bandwidth is only limited by the practicable gain of the cathode follower, subject of course, to the maximum bandpass of the critically-coupled double-tuned transformer. Thus, for a gain of 0.8, the ratio between maximum and minimum bandpass, would be 5 to 1.

Although in the exemplary embodiment of Fig. 1 the shunting networks are shown and described as identical networks, it is understood that these circuits have been so shown and described merely to indicated that, in a critically-coupled situation, the Q of the first tuned circuit and its shunting network is identical with the Q of the second tuned circuit with its shunting network. It is understood, of course, it is not essential that the device of this invention be employed in a critically-coupled transformer arrangement or that the Q of the circuitry be identical.

Furthermore, it is understood that it is within the purview of this invention to vary the gain of the cathode followers employed in the variable reactance shunting network by other means well known in the art, and that the invention is not to be limited to the gain variation means shown in the drawing.

Finally it is understood that this invention is to be limited only by the scope of the claims appended hereto.

What is claimed is:

1. An improved double-tuned transformer comprising two inductively coupled parallel resonant tuned circuits, frequency sensitive variable impedance networks shunting each of said parallel resonant tuned circuits, each of said impedance networks comprising a cathode follower means having grid input terminals and cathode output terminals, means connecting the first said terminals of each network such that the input of each of said cathode followers is in shunt with its respective parallel resonant tuned circuit, a piezoelectric crystal element and an inductance connected in series between the grid connected input terminal and the cathode connected output terminal of said cathode follower means, said crystal element being parallel resonant at substantially the same frequency as the tuned circuit it shunts, said inductance having a magnitude operative to resonate with the equivalent capacitance of said crystal at the parallel resonant frequency of the crystal, and means for varying the gain of said cathode follower means.

2. An improved double-tuned transformer comprising two inductively coupled parallel resonant tuned circuits, frequency sensitive variable impedance networks shunting each of said parallel resonant tuned circuits, at least one of said impedance networks comprising a cathode follower means having grid input terminals and cathode output terminals, means connecting the first said terminals such that the input of said cathode follower is in shunt with its respective parallel resonant tuned circuit, a piezoelectric crystal element and an inductance connected in series between the grid connected input terminal and the cathode connected output terminal of said cathode follower means, said crystal element being parallel resonant at substantially the same frequency as the tuned circuit it shunts, said inductance having a magnitude operative to resonate, with the equivalent capacitance of said crystal at the parallel resonant frequency of the crystal, and means for varying the gain of said cathode follower means.

3. In an improved double-tuned transformer coupling means, frequency sensitive impedance means shunting the input and output circuits of said double-tuned transformer, at least one of said frequency sensitive impedance means comprising a piezoelectric crystal element and an inductance connected in series across its respective tuned circuit of the double-tuned transformer, said crystal element being parallel resonant at substantially the same frequency as the tuned circuit it shunts, said inductance having a magnitude operative to resonate with the equivalent capacitance of said crystal element at the parallel resonant frequency of the crystal, plus means for varying the impedance of said frequency sensitive impedance means.

4. In an improved double-tuned transformer coupling means, frequency sensitive impedance means shunting the input and output circuits of said double-tuned transformer, each of said frequency sensitive impedance means comprising a piezoelectric crystal element and an inductance connected in series across its respective tuned circuit of the double-tuned transformer, said crystal element being parallel resonant at substantially the same frequency as the tuned circuit it shunts, said inductance having a magnitude operative to resonate with the equivalent capacitance of said crystal element at the parallel resonant frequency of the crystal, plus means for varying the impedance of said frequency sensitive impedance means.

5. An improved double-tuned transformer comprising two inductively coupled parallel resonant tuned circuits, frequency sensitive variable impedance means shunting at least one of said parallel resonant tuned circuits, said frequency sensitive variable impedance means comprising a piezoelectric crystal element and an inductance connected in series across its respective tuned circuit of the double-tuned transformer, said crystal element being parallel resonant at substantially the same frequency as the tuned circuit it shunts, said inductance having a magnitude operative to resonate with the equivalent capacitance of said crystal element at the parallel resonant frequency of the crystal, plus means for varying the impedance of said frequency sensitive impedance means.

6. An improved double-tuned transformer comprising two inductively coupled parallel resonant tuned circuits, frequency sensitive variable impedance networks shunting each of said parallel resonant tuned circuits, each of said impedance networks comprising a cathode follower means having grid input terminals and cathode output terminals, means connecting the first said terminals of each network such that the input of each of said cathode followers is in shunt with its respective parallel resonant tuned circuit, a piezoelectric crystal element and an inductance connected in series between the grid connected input terminal and the cathode connected output terminal of said cathode follower means, said crystal element being parallel resonant at substantially the same frequency as the tuned circuit it shunts, said inductance having a magnitude operative to resonate with the equivalent capacitance of said crystal at the parallel resonant frequency of the crystal, and simultaneously operative means for varying the gain of said cathode follower means.

References Cited in the file of this patent

UNITED STATES PATENTS

| | | |
|---|---|---|
| 2,037,498 | Clay | Apr. 14, 1936 |
| 2,156,076 | Beggs | Apr. 25, 1939 |
| 2,234,461 | Tubbs | Mar. 11, 1941 |
| 2,323,598 | Hathaway | July 6, 1943 |

FOREIGN PATENTS

| | | |
|---|---|---|
| 956,889 | France | Aug. 15, 1949 |